US012802169B2

(12) United States Patent
Benderius

(10) Patent No.: US 12,802,169 B2
(45) Date of Patent: Nov. 17, 2026

(54) SYSTEM AND METHOD FOR FUSING TWO OR MORE SOURCE IMAGES INTO A TARGET IMAGE

(71) Applicant: Axis AB, Lund (SE)

(72) Inventor: Björn Benderius, Lund (SE)

(73) Assignee: AXIS AB, Lund (SE)

( * ) Notice: Subject to any disclaimer, the term of this patent is extended or adjusted under 35 U.S.C. 154(b) by 308 days.

(21) Appl. No.: 18/433,962

(22) Filed: Feb. 6, 2024

(65) Prior Publication Data

US 2024/0273679 A1 Aug. 15, 2024

(30) Foreign Application Priority Data

Feb. 14, 2023 (EP) .................................... 23156434

(51) Int. Cl.
*G06T 5/50* (2006.01)

(52) U.S. Cl.
CPC ...... *G06T 5/50* (2013.01); *G06T 2207/20221* (2013.01)

(58) Field of Classification Search
CPC ........................ G06T 5/50; G06T 2207/20221
See application file for complete search history.

(56) References Cited

U.S. PATENT DOCUMENTS 7,515,747 B2 * 4/2009 Okutomi .............. H04N 25/134 382/167
7,809,732 B2 * 10/2010 Kusama .................. G06T 11/00 382/284
8,358,877 B2 * 1/2013 Noguchi .............. H04N 19/137 382/243

(Continued)

FOREIGN PATENT DOCUMENTS

CA 2797054 A1 10/2011
CN 114445308 A 5/2022

(Continued)

OTHER PUBLICATIONS

Li, Region-based Multi-focus Image Fusion Using the Local Spatial Frequency, 2013, IEEE, pp. 3792-3796. (Year: 2013).*

(Continued)

*Primary Examiner* — Cheng Yuan Tseng
(74) *Attorney, Agent, or Firm* — Volpe Koenig

(57) ABSTRACT

A method for fusing a primary image (P) and a secondary image (S) into a target image comprises determining a local noise level of a region of the primary image; deriving a low-frequency, LF, component ($P_{LF}$) from said region of the primary image and a high-frequency, HF, component ($S_{HF}$) from a corresponding region of the secondary image, wherein the LF and HF components refer to a common cut-off frequency; combining the LF component and the HF component into a target image region, wherein the HF component's relative contribution to the target image region increases gradually with the local noise level; and repeating the preceding operations and merging all output target image regions thus obtained into the target image. A system implementing said method is also provided.

21 Claims, 6 Drawing Sheets

(56) References Cited

U.S. PATENT DOCUMENTS

| | | | | |
|---|---|---|---|---|
| 8,509,545 | B2 * | 8/2013 | Dedhia | G06T 7/12 382/173 |
| 9,258,518 | B2 * | 2/2016 | Salvador | H04N 7/0117 |
| 10,891,716 | B2 * | 1/2021 | Saavedra Rubilar | G06T 5/10 |
| 10,951,825 | B2 * | 3/2021 | Huo | H04N 5/21 |
| 10,972,718 | B2 * | 4/2021 | Kawabe | H04N 13/268 |
| 11,120,584 | B2 * | 9/2021 | Li | G01R 33/5608 |
| 11,637,960 | B2 * | 4/2023 | Ise | H04N 23/74 382/100 |
| 11,651,531 | B2 * | 5/2023 | Li | G01R 33/5673 324/309 |
| 11,684,240 | B2 * | 6/2023 | Orth | G02B 23/26 385/117 |
| 11,769,236 | B2 * | 9/2023 | Amthor | G06T 5/90 348/79 |
| 11,843,863 | B2 * | 12/2023 | Song | G06T 5/92 |
| 11,852,708 | B2 * | 12/2023 | Fuderer | G01R 33/56527 |
| 11,989,863 | B2 * | 5/2024 | Wang | G06T 5/40 |
| 12,026,890 | B2 * | 7/2024 | Koch | G06T 7/174 |
| 12,058,449 | B2 * | 8/2024 | Sasaki | H04N 23/76 |
| 12,155,941 | B2 * | 11/2024 | Varghese | H04N 23/62 |
| 12,302,003 | B2 * | 5/2025 | Skotheim | H04N 13/254 |
| 12,387,342 | B2 * | 8/2025 | Funamoto | G06V 10/56 |
| 12,462,340 | B2 * | 11/2025 | Schulze | G06V 10/56 |
| 12,505,516 | B2 * | 12/2025 | Van Aert | G06T 5/70 |
| 2015/0264259 | A1 * | 9/2015 | Raghoebardajal | G06T 3/12 348/36 |
| 2019/0188838 | A1 | 6/2019 | Nie et al. | |
| 2021/0218871 | A1 | 7/2021 | Peng et al. | |
| 2023/0232103 | A1 * | 7/2023 | Kobayashi | H04N 13/344 348/158 |
| 2024/0331099 | A1 * | 10/2024 | Huberman | G06T 7/593 |

FOREIGN PATENT DOCUMENTS

| | | | | |
|---|---|---|---|---|
| CN | 116843575 | A * | 10/2023 | G06T 5/50 |
| EP | 2570988 | A2 | 3/2013 | |
| EP | 2471258 | B1 | 5/2017 | |
| EP | 3518179 | A1 | 7/2019 | |
| WO | 2013131929 | A1 | 9/2013 | |
| WO | 2018120936 | A1 | 7/2018 | |
| WO | 2020103601 | A1 | 5/2020 | |
| WO | 2021184027 | A8 | 9/2021 | |

OTHER PUBLICATIONS

Yang, Multimodal Medical Image Fusion Based on Weighted Local Energy Matching Measurement and Improved Spatial Frequency, 2021, IEEE Transactions, pp. 1-16. (Year: 2021).*

Li, Combination of Images with Diverse Focuses Using the Spatial Frequency, 2001, Elsevier, pp. 1-8. (Year: 2001).*

Chen, SFCFusion: Spatial-Frequency Collaborative Infrared and Visible Image Fusion, 2024, IEEE Transaction, pp. 1-15. (Year: 2024).*

Extended European Search Report issued on Aug. 18, 2023 for European Patent Application No. 23156434.5.

Bennett, E.P., "Multispectral Bilateral Video Fusion," in IEEE Transactions on Image Processing, (2007).

* cited by examiner

SYSTEM AND METHOD FOR FUSING TWO OR MORE SOURCE IMAGES INTO A TARGET IMAGE

FIELD OF INVENTION

The present disclosure relates to the field of image processing. In particular, it proposes a method for fusing a primary image and a secondary image. The method may be applied to visible-light image to be combined with an infrared-light image.

TECHNICAL BACKGROUND

Image fusion is known to include processes where information from multiple source images is combined into fewer target images, usually a single target image. The target image is expected to be more informative, more accurate or of higher quality than each of the single source images, and it consists of all the necessary information. Image fusion is practiced for various purposes, one of which is to construct images that are more appropriate and understandable for a human viewer or more useful for machine perception. The source images may differ with respect to the focus depth (multi-focus image fusion), the wavelength range used for photographic imaging (multi-spectral image fusion) and/or the imaging modality (multi-modal image fusion). Imaging modalities in this sense include imaging by reflection (e.g., conventional visual photography), penetration (e.g., X-ray imaging) and emission (e.g., magnetic resonance, ultrasound).

The combining operation at the core of the image fusion may be performed in the spatial domain or in a transform domain. In broad terms, the spatial-domain image fusion may be described as a patching together of pixels or pixel groups at their respective locations. If the image fusion is carried out in the transform domain, the combining action is applied to different transform components computed from the source images. For example, image fusion in the frequency domain (spatial-frequency domain) includes combining spectral elements of the images.

From EP2570988A2 and similar disclosures, it is known to apply image fusion methods in order to combine a visual image with an infrared image. More precisely, EP2570988A2 proposes a method by which a first image of a scene is received, wherein the first image is a visual image captured using a visual image sensor; a second image of a scene is received, wherein the second image is an infrared image captured using an infrared image sensor; high spatial-frequency content is extracted from said visual image, wherein the high spatial-frequency content includes edges or contours of the visual image; and the extracted high spatial-frequency content from said visual image is combined with the infrared image to increase the level of detail of the infrared image. The method according to EP2570988A2 produces an infrared target image.

WO2018120936A1 discloses an image fusion method, comprising: obtaining a visible light image and an infrared image relating to a same scene; performing a first decomposition to the visible light image to obtain a first high-frequency component of the visible light image and a first low-frequency component of the visible light image; performing a first decomposition to the infrared image to obtain a first high-frequency component of the infrared image and a first low-frequency component of the infrared image; fusing the first high-frequency component of the visible light image and the first high-frequency component of the infrared image based on a first algorithm to generate a first fused high-frequency component; and performing reconstruction based on the first fused high-frequency component, the first low-frequency component of the visible light image, and the first low-frequency component of the infrared image to generate a fused image. Optionally, a pair of low-frequency components corresponding to the visible light image and the infrared image may be fused to generate a fused low-frequency component. The low-frequency component of the visible light image and the low-frequency component of the infrared image may be assigned weighting factors, which are set based on brightness of the surrounding environment, color contrast of the targeted scene, preference of the user, etc.

EP3518179A1 discloses an image collection device for light splitting and fusion, comprising: a light splitter, a visible spectrum imaging module, a non-visible spectrum imaging module, a registration unit, a pre-processing synthesizing unit, and a fusion unit; wherein the light splitter is configured to split incident light into a visible light and a non-visible light; the visible spectrum imaging module is configured to perform photosensitive imaging according to the visible light split by the light splitter to form a first visible light image; the non-visible spectrum imaging module is configured to perform photosensitive imaging according to the non-visible light split by the light splitter to form a first non-visible light image; the registration unit is configured to perform position registration on the first visible light image and the first non-visible light image to obtain a target visible light image and a second non-visible light image; the pre-processing synthesizing unit is configured to perform brightness adjustment on the second non-visible light image to obtain a target non-visible light image; the fusion unit is configured to perform image fusion on the target visible light image and the target non-visible light image to obtain a fused image. Optionally, the fusion unit may be configured to: perform color space conversion on the target visible light image to obtain a brightness component and a color component of the target visible light image; perform low-pass filtering on the brightness component to obtain low frequency information of the target visible light image; perform high-pass filtering on the target non-visible light image to obtain high frequency information of the target non-visible light image; and perform weighting processing on the low frequency information and the high frequency information according to a corresponding second type of weight value to obtain a brightness component corresponding to a fused image to be formed. The second type of weight value can be determined according to a brightness difference between the brightness components of the target non-visible light image and the target visible light image.

WO2013131929A1 discloses a method with the following steps: spatially interpolating frames of an input video frame sequence, wherein high-resolution, low-frequency (HRLF) spatial and temporal bands are generated; performing cross-frame spatial high-frequency extrapolation on video frames of the input data sequence, wherein a high-resolution, high-frequency (HRHF) spatial band is generated; and fusing the HRLF spatial and temporal bands and the HRHF spatial band, whereby a spatio-temporally super-resolved video sequence is obtained.

WO2021184027A1 discusses techniques for fusing two images. It is assumed that a first image and a second image are captured simultaneously in a scene. In an example, the first and second images include an RGB image and an near infrared (NIR) image. After the images are captured, they are processed and fused into a new compact form of image—the fused image—which contains details from both images. The fused image is then tuned towards color of the first image, e.g., an original input RGB image, while preserving details of the fused image. An optional color correction operation can be applied, in which the fused image is decomposed to a fusion base component a fusion detail component, e.g., using a first guided image filter. The first image for its part is decomposed to a first base component and a first detail component, e.g., using a second guided image filter. In some embodiments, the fusion base and detail components include low-frequency and high-frequency information of the fusion image, and the first base and detail components include low-frequency and high-frequency information of the first image. The first base component of the first image and the fusion detail component of the fused image are combined to a final image, which thereby maintains a base color of the first image while having details of the fused image.

Practical implementations of image fusion are also known to produce a certain amount of artefacts, which may be noticed by a human viewer. As used herein, in the context of image fusion, an artefact (or visual artefact) is a visual feature in the target image that was not present in either of the source images. The artefact may be structural—it seemingly adds new lines, shapes, surfaces or other graphic information to the image—or it may alter the chromaticity, luminosity, contrast or other technical properties of the image or a portion thereof. Artefacts may be typologized into intra-image artefacts, which can be noticed within a target image, and inter-image artefacts, including gradual and sudden changes in the overall luminosity or overall chromaticity of the image. While such changes may be of little consequence in a single target image, they could be easily noticed during playback of a video sequence or otherwise when a number of images are rendered successively. In addition to such primarily aesthetical concerns, it may be envisaged that a fused image or video sequence with significant artefacts could lead a machine perception system into erroneous decision-making. For example, a video monitoring system might trigger an alarm based on a mistaken conclusion that a moving artefact would be an intruder.

For these reasons, it would be desirable to provide image fusion techniques that are less prone to produce artefacts.

SUMMARY

One objective of the present disclosure is to make available a method of fusing two or more source images into a target image such that the target image can be expected to contain less artefacts than with comparable prior art methods. A further objective is to make available such a method with the property that the target image can be expected to be free from artefacts which are serious in the sense of being noticeable by a non-expert viewer and/or of having a potential to mislead a machine perception system. It is a further objective of the present disclosure to propose a method of fusing a noisy source image with a further source image into a target image which has a controlled noise content. A further objective is to propose a method by which a source image of an unevenly illuminated scene can be improved by fusion with a secondary source image. A further objective is to propose such a method that is minimally destructive to the source image, in particular, a method that adds as little data as possible from the secondary source image. A still further objective is to make available a device and a software program with these abilities.

In a first aspect of the present disclosure, there is provided a method of fusing a primary image and at least one secondary image. In general terms, the primary image may be identified by being noisier than the secondary image in a well-defined sense. For example, the local signal-to-noise ratio (SNR) of the primary image may be lower than the SNR of the secondary image in the majority of the image regions, or a global SNR metric (e.g., average, median, q-quantile) of the primary image may be lower than the same global SNR metric of the secondary image. Alternatively, the primary image may be identified by relating to a richer visual representation than the secondary image. The representation may be richer with respect to the number of channels; for example, the primary image may be a color image expressed in a color space with a plurality of color channels (e.g., RGB, YCbCr, HSV) whereas the secondary image is a monochrome image (e.g., infrared or near-infrared image, or a night-mode image). Because the signal energy has to be divided between multiple channels in a primary image of this type, the SNR may be expected to be lower. Further alternatively, the primary image may be identified as the user's preference over the secondary image (s). This is to say, by feeding a particular image to the image fusion method in the capacity of primary image, the user expresses a wish to preserve the characteristics of said particular image to the largest possible extent and avoid introducing image data from the secondary image as far as possible.

The method according to the first aspect comprises: determining a local noise level of a region P(m, n) of the primary image; deriving a low-frequency (LF) component $P_{LF}(m, n)$ from said region of the primary image and a high-frequency (HF) component $S_{HF}(m, n)$ from a corresponding region S(m, n) of the secondary image; combining the LF component and the HF component into a target image region T(m, n), wherein the HF component's relative contribution to the target image region increases gradually with the local noise level; repeating the preceding operations and merging all output target image regions thus obtained into a target image. It is understood that the LF and HF components generally refer to a common cut-off frequency $f_c$ and that the cut-off frequency is applied with any suitable degree of steepness; generally, some amount of roll-off is included to avoid certain artefacts, and the roll-off may be dependent on the local noise level or other characteristics of the image region, and also in view of the particulars of the use case at hand. For the avoidance of doubt, the cut-off frequency $f_c$ refers to spatial frequency of the image data, not wavelength of photographic light which was used to acquire the primary or secondary image. A region of the primary image is a pixel or a group of pixels, and the corresponding region of the secondary image is located identically in terms of image coordinates.

An advantage associated with the first aspect of the present disclosure is that the HF component's relative contribution to the target image region increases gradually with the local noise level, whereby threshold-type artefacts (or quantization artefacts) are to some degree avoided, and the characteristics of the primary image are preserved to the greatest extent possible. Because the contribution from the HF component is added in accordance with the local noise level of the primary image, the noise content of the target image can be controlled. In the language of the present disclosure, an increase is not gradual with respect to the local noise level if it consists of a single step, i.e., a discontinuous or binary increase. By contrast, the contribution from the HF component is said to increase gradually if it has a continuous dependence on the local noise level. Provision is made for the fact that strict mathematical continuity is not possible in the context of digital signal processing, where all variables are necessarily represented in quantized form: even though a function, however smooth, cannot vary by finer steps than the numerical resolution (floating-point precision) of the digital processing system—it may be described as quasi-continuous—it shall nevertheless be considered to be continuous for the purposes of this disclosure.

The method according to the first aspect can be embodied in a variety of ways. Three main groups of embodiments can be discerned, which will be described in separate sections of the present disclosure. Technical features can be combined across these groups of embodiments, and in particular it is possible to apply different technical features belonging to different groups of embodiments to different regions of a single primary image.

In a first group of embodiments, the cut-off frequency is variable across the primary image. Embodiments in this group may provide that the image fusion method comprises an additional step of determining the cut-off frequency on the basis of the local noise level of said region of the primary image. This determination can be repeated for one or more further regions of the primary image, so that different values of the cut-off frequency are applied when the respective LF and HF components are derived.

Specifically, the cut-off frequency is determined using a non-increasing function of the local noise level. The noisier the region of the primary image is, the greater part of the spectrum of the target image region will originate from the secondary image; conversely, for a primary image region with a relatively low noise content, the characteristics of the primary image are preserved to a relatively large degree. The non-increasing function of the local noise level is preferably a continuous function (including, as mentioned, the case of quasi-continuous functions in digital signal processing) composed of a plurality of small increments. This way, the HF component's relative contribution to the target image region increases gradually with the local noise level, whereby threshold-type artefacts are avoided.

In a second group of embodiments of the first aspect, the LF component and the HF component (and possibly further components) are combined in accordance with one or more weighting coefficients $$w_{LF}^{(P)}, w_{HF}^{(P)}, w_{LF}^{(S)}, w_{HF}^{(S)}$$

which are variable across the primary image. Embodiments in this group may comprise an additional step of determining the weighting coefficients on the basis of the local noise level of said region of the primary image. This determination can be repeated for one or more further regions of the primary image, so that different values of the weighting coefficients are applied when the respective LF and HF components (and any further components) are combined.

Particularly, in some of the embodiments within the second group, a secondary coefficient $$w_{LF}^{(S)}, w_{HF}^{(S)}$$

to be applied to a component of the corresponding region of the secondary image is a non-decreasing function of the local noise level. The noisier the region of the primary image is, the more image data in the target image region will originate from the secondary image; conversely, for a primary image region with a relatively low noise content, the characteristics of the primary image are preserved to a relatively large degree. Alternatively or additionally, a primary coefficient $$w_{LF}^{(P)}, w_{HF}^{(P)}$$

to be applied to a component of the region of the primary image is a non-increasing function of the local noise level. The use of a primary coefficient with these properties has a corresponding effect of balancing the contributions from the primary and secondary images in accordance with the local noise level.

In different embodiments within the second group, the cut-off frequency can be variable or constant throughout the primary image. The use of a constant cut-off frequency is likely to provide simplicity and robustness. It may further avoid undesired feedback behaviors (e.g., oscillations) and/or undesired mutual compensation effects when the cut-off frequency $f_c$ and the weighting coefficients $$w_{LF}^{(P)}, w_{HF}^{(P)}, w_{LF}^{(S)}, w_{HF}^{(S)}$$

vary in response to the same or correlated local characteristics of the primary image. The constant cut-off frequency may be based on a global characteristic of the primary image and/or the secondary image. Alternatively, the constant cut-off frequency may have a predefined value.

In a third group of embodiments of the first aspect, a local noise level of the corresponding region of the secondary image is determined, i.e., in addition to the local noise level of the region of primary image. When the LF and HF components are combined, then, the HF component's relative contribution can be determined such that the target image region's local noise level is maintained below a threshold noise level. As already explained, the region of the primary image is generally noisier than the corresponding region of the secondary image, and the noisiness is alleviated by adding an amount of data from the secondary image (or more precisely, from the HF component derived therefrom). As the inventor has realized, however, the suitable amount of data from the secondary image depends not only on the local noise level of the primary image but also on the local noise level of the secondary image. Indeed, the noisier the corresponding region of the secondary image is, the more of it needs to be added in order to reduce the local noise level of the primary image down to a acceptable noise level. Based on the respective noise levels of the region of the primary image and the corresponding region of the secondary image, it is possible to make a reliable prediction of the resulting local noise level of the target image region. The prediction may rely on a linear combination of the noise levels, or on some type of regression model or trained model.

On the basis of these considerations, in some embodiments, the HF component's relative contribution may be computed as the minimal or substantially minimal value such that the target image region's local noise level is below the threshold noise level. This may be achieved by aiming to combine the HF and LF components such that the threshold noise level is reached exactly and then increase or upscale the HF component's contribution by a predefined margin. Alternatively, the minimality may be achieved by starting from a low value of the HF component's contribution and iteratively increasing it in small steps until the target image region's local noise level falls below the threshold noise level. Equivalently, the computations may aim to determine the relative contribution of the LF component such that the target region's noise level is below the threshold noise level.

The contribution of the HF component relative to the LF component is controlled by means of weighting coefficients $$w_{LF}^{(P)}, w_{HF}^{(P)}, w_{LF}^{(S)}, w_{HF}^{(S)}$$

in some embodiments within the third group, and it is controlled by means of the cut-off frequency $f_c$ in other embodiments. It is understood that the weighting coefficients $$w_{LF}^{(P)}, w_{HF}^{(P)}, w_{LF}^{(S)}, w_{HF}^{(S)}$$

or cut-off frequency $f_c$, respectively, are then variable across the primary image, and a determination is made independently for each region of the primary image. The determination is made in view of the threshold noise level. The threshold noise level may be a predefined value, especially a globally applicable predefined value, which system owners can configure as they see fit. Alternatively, the threshold level may be computed for each new primary image or each new secondary image or each new combination of a primary and second image on the basis of a global characteristic of the image(s).

In a specific embodiment within the third group, the local noise level of the LF component and the local noise level of the HF component are determined. With this information at hand, the prediction of the resulting local noise level of the target image region can be made particularly reliable. The prediction may rely on a linear combination of the noise levels, or on some type of regression model or trained model.

In each of the above-outlined embodiments of the image fusion method according to the first aspect, it is optional to normalize the secondary image to the primary image before the combining has been carried out. To be sure, the normalization may be an integral part of the combining step, or it may be performed prior to the combining. The normalization may, in broad terms, be a rescaling of the secondary image by a scaling factor such that the LF component of the primary image becomes comparable or equal to a LF component (with respect to an equal cut-off frequency $f_c$) of the secondary image. It is possible to implement the normalization as an operation acting on the primary image rather than the secondary image, or as an operation acting on both the primary and secondary image.

In each of the above-outlined embodiments of the first aspect, furthermore, the local noise level of the region of the primary image may be determined using a sensor-noise model, which depends on a local sensor reading. Alternatively, the local noise level of the region of the primary image may be determined by a direct computation and/or by a measurement.

In one envisioned use case of the image fusion method according to the first aspect, the primary image is a photographic image acquired using predominantly visible light, such as a color image, and/or the secondary image is a photographic image acquired using predominantly invisible light, such as an infrared or near-infrared image.

In a second aspect of the present disclosure, there is provided a device which has processing circuitry arranged to perform the method of the first aspect. The second aspect generally shares the effects and advantages of the first aspect, and it can be implemented with a corresponding degree of technical variation.

This disclosure further relates to a computer program containing instructions for causing a computer to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the disclosure are shown. These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

System Overview

Figure 6:
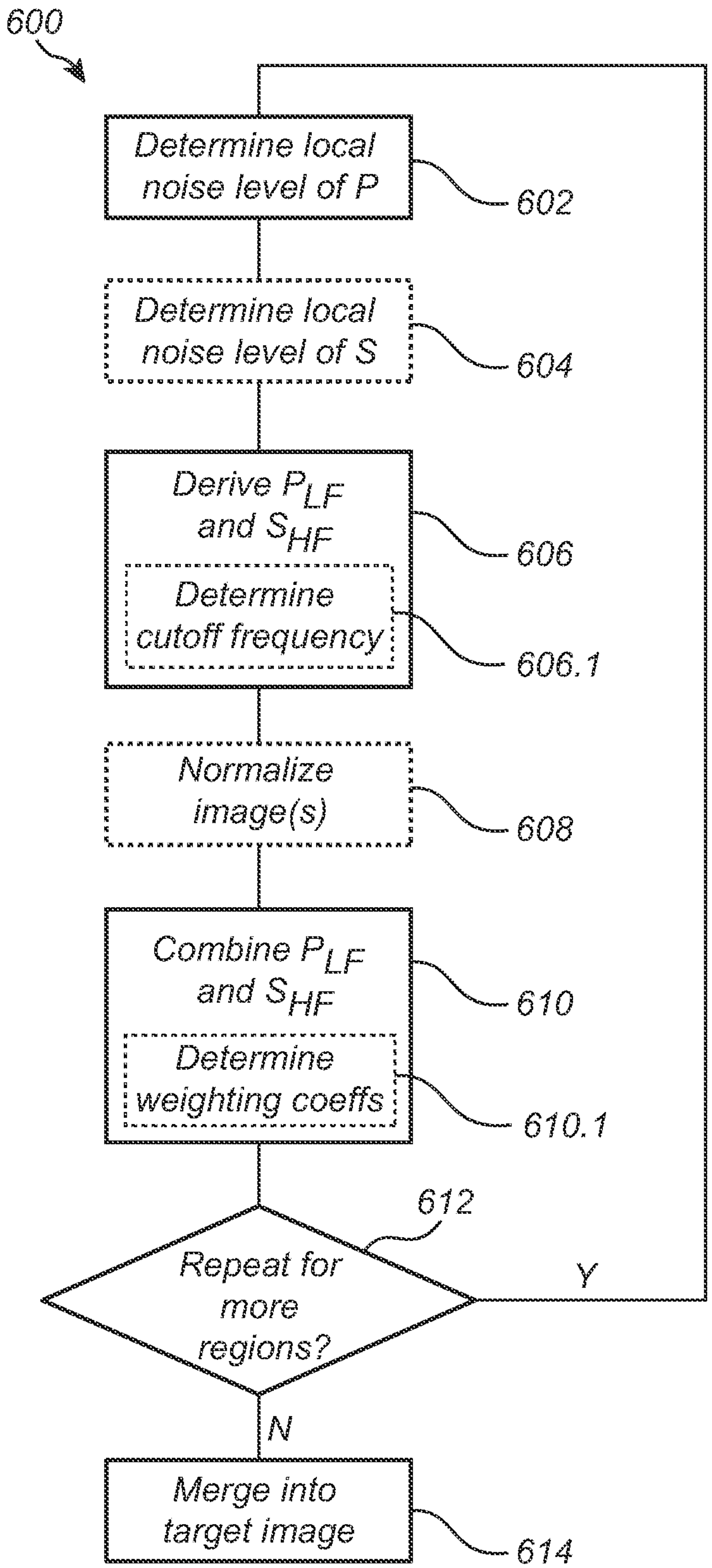
FIG. 6 is a flowchart of an image fusion method according to embodiments herein.

Embodiments of an image fusion method 600 will now be described with continuing reference to the flowchart of FIG. 6. The method 600 operates on a primary image P and one or more secondary images S.

The method 600 may be carried out by a general-purpose computer. In particular, the method 600 may be carried out by a device of the type illustrated in FIG. 7. The device 730 in FIG. 7 comprises processing circuitry 731, such as a central processing unit or a graphics processing unit, a data connection towards a source of the primary image P and a source of the secondary image(s) S, as well as a data connection towards a recipient of the target image T to be produced by the method 600. The device 730 may constitute, or be part of, a video management system (VMS) or a video authoring tool.

Figure 7:
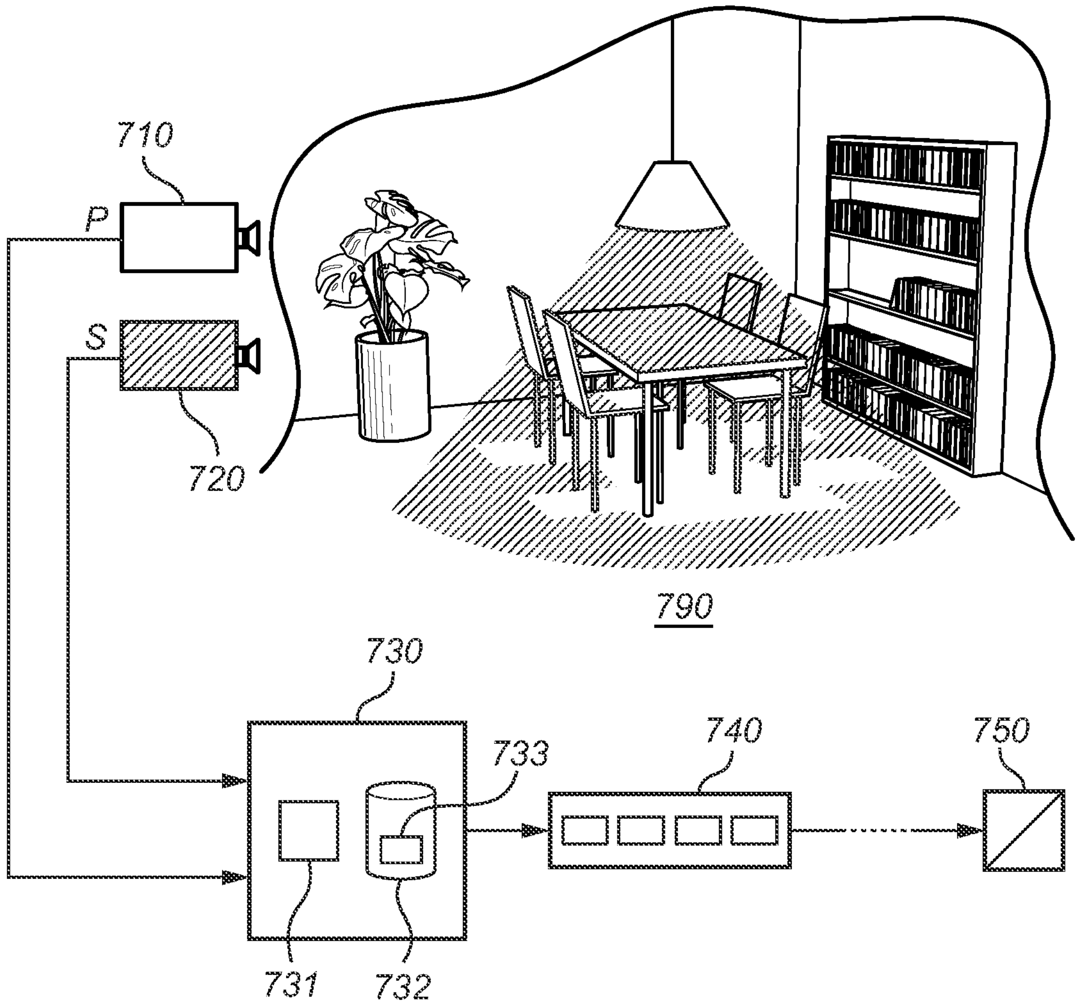
FIG. 7 shows a local arrangement with cameras for acquiring a primary and a secondary image of a scene, as well as a device configured to fuse the primary and secondary images into a target image.

The processing circuitry 731 is configured to execute a computer program 733, which is stored in a memory 732 of the device 730. In the example of FIG. 7, the source of the primary image is an RGB camera 710 and the source of the secondary image is an infrared camera 720. The infrared camera 720 may be a night camera which is associated with an active infrared light source directed at an area of the scene 790. Both cameras 710, 720, which may be digital cameras or digital video cameras, are directed at a scene 790, which is illuminated in a (spatially) uneven fashion at the relevant times, which makes it a challenging subject-matter for photography. In particular, the scene 790 is illuminated by a single downward light source with does not cover the full horizontal extent of the scene 790, and furniture is present in the cone of light that obscures it and creates sharp shadows on the floor. A visual-light image, particularly a color image, of the scene 790 may be expected to have a high local noise content (i.e., low SNR) in the darker areas. It is recalled that the improvement of photographic images with heterogenous illumination is an intended use case of the image fusion method 600, namely, by fusing the photographic image (primary image) with a monochrome image (secondary image). It is understood that the cameras 710, 720, which acquire the primary and secondary images, are configured to do so approximately simultaneously, so that the scene 790 does not change appreciably therebetween. It is understood that despite such approximate simultaneity, the primary and secondary images can be acquired with different exposure times.

As illustrated in FIG. 7, the device 730 outputs the target images T to a memory 740 as they are produced. From the memory 740, a local or remote recipient may retrieve target images and use them for playback (e.g., using an interface 750) or for further editing. At least some of the arrows in FIG. 7 symbolize remote connections, such as data connection over the Internet or another wide-area communication network. Each of said arrows may symbolize a wired or wireless data connection.

Figure 8:
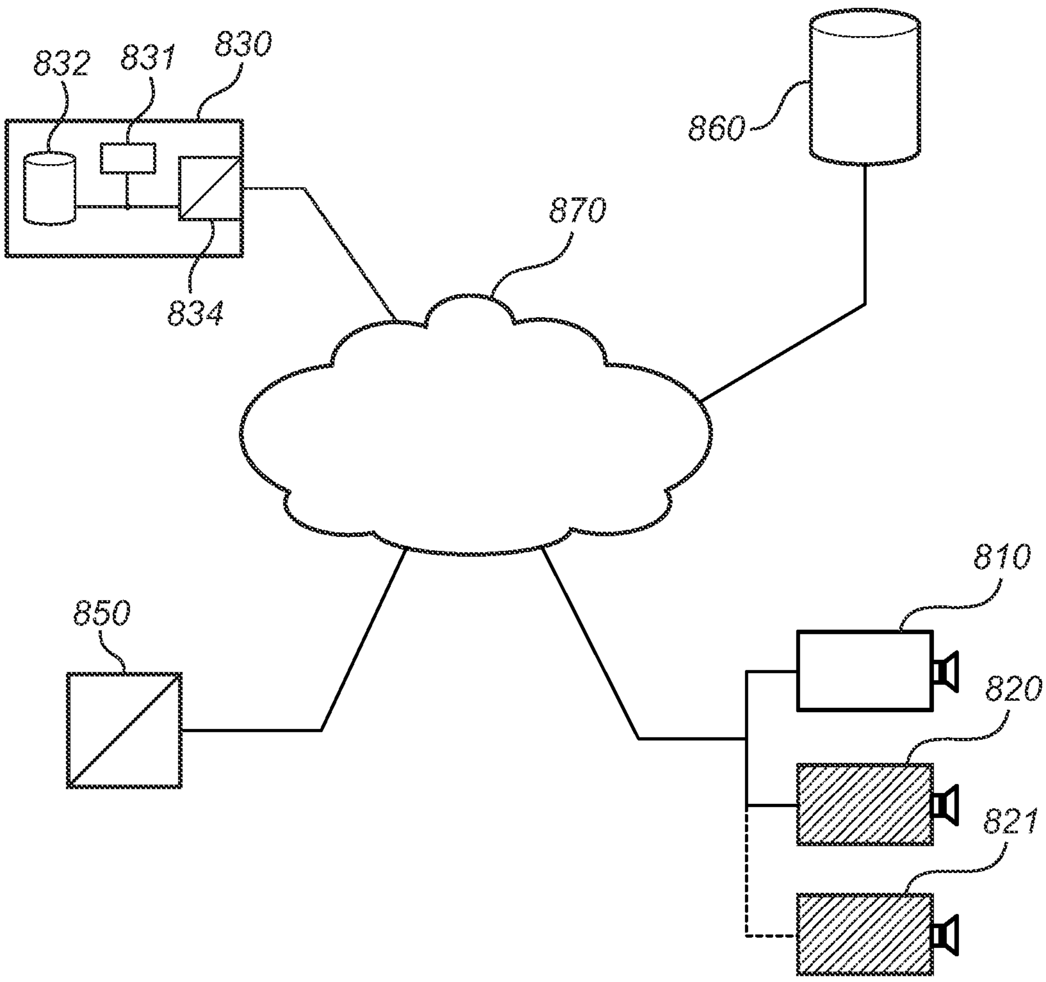
FIG. 8 illustrates a possible distributed implementation, including a plurality of networked entities, of the arrangement seen in FIG. 7.

As an alternative to this localized implementation, FIG. 8 illustrates a possible distributed implementation. Here, a plurality of networked entities cooperate while exchanging information over a communication network 870. The networked entities, some of which may be characterized as cloud or edge equipment, include an image fusion device 830 functionally equivalent to the device 730 described above. There is further provided a primary imaging device 810 and a plurality of secondary imaging devices 820, 821, for acquiring the primary and secondary images, respectively. Among the networked entities, there is further seen a server (or host computer) 860 for storing source images to be fed to the image fusion device 830, or target images resulting produced by the image fusion device 830. There is further provided a user interface 850 configured to allow editing, playback or other forms of consumption of the images.

It is noted that the primary and secondary images may, in some embodiments, be frames in respective video sequences and that the target images may be combined into a target video sequence. Preferably, the cameras 710, 720 which acquire these video sequences, from which the primary and secondary images originate, are synchronized least approximately. Such approximate time synchronicity may be considered to be fulfilled if the appearance of the scene 790 does not have time to change appreciably between the acquisition of two corresponding frames in the respective video sequences. This justifies the use of image data from the secondary image to improve the primary image. The time synchronization may be achieved by feeding a trigger signal to the cameras 710, 720 and/or by making available a common clock signal and a pre-agreed timing schedule.

As discussed in an earlier section of this disclosure, the primary image may be identified as the noisier one, in comparison with the secondary image. The noisiness may refer to the local signal-to-noise ratio (SNR), which may be lower in the primary image in a local sense in the majority of the image regions, or which may be lower in a global sense, e.g., in terms of average, median or q-quantile. The primary/secondary identification may as well refer to a metric similar to SNR, such as signal-to-interference-and-noise ratio (SINR), a signal-to-noise statistic, peak SNR, or an absolute noise measurement. It is understood that the noisiness corresponds to the inverse value of SNR, wherein a teaching such as "variable X increases gradually with the local noise level" can be equivalently expressed as "variable X decreases gradually with the local SNR".

As has also been mentioned, the primary image may alternatively be identified in that it is represented in terms of more channels than the secondary image (e.g., color vs monochrome), which typically increases its vulnerability to sensor noise. Further still, an input image may be considered to be the primary image simply because a user, on whose behalf the method 600 is carried out, prefers to maintain as much of the image data of that image as possible and add as little image data from the secondary image as possible.

Figure 5:
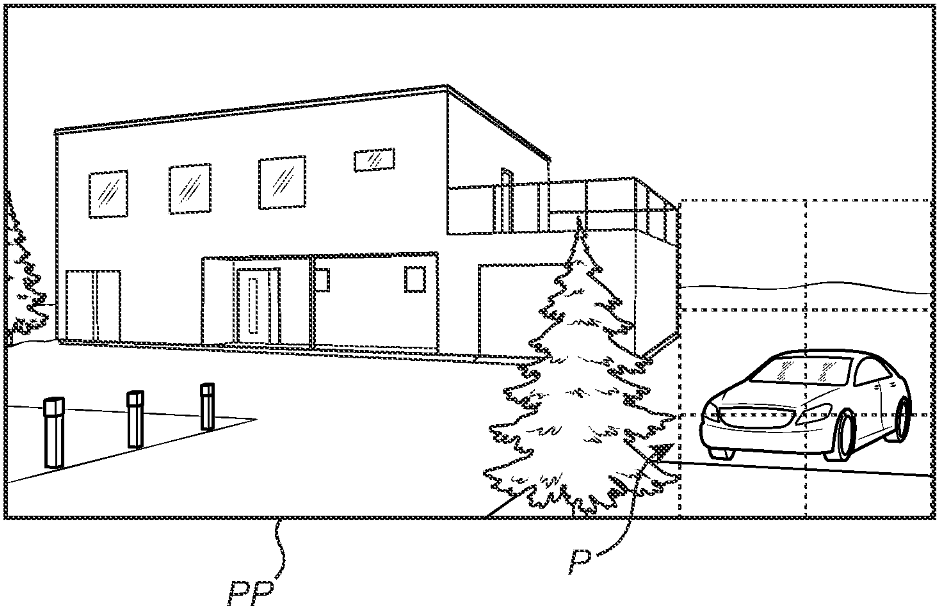
FIG. 5 shows, in its upper part, a panoramic primary image PP of a scene and a secondary image S of a portion of the same scene, wherein the panoramic primary image's PP overlap with the secondary image S is identified as the primary image P.
Figure 5:
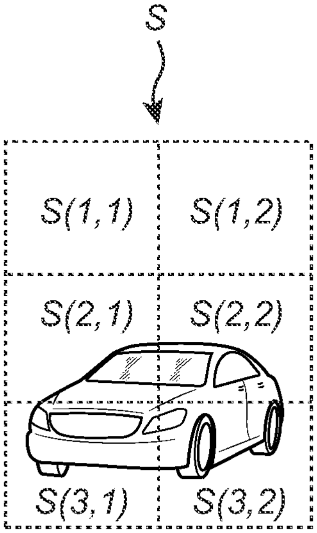

For simplicity of the following description, it is assumed that the primary and secondary images have equal extents, in the sense that they depict a common portion of a scene. With reference to FIG. 5, it is noted that this assumption does not exclude the case where the primary image P originates from a panoramic (or full-angle, or overview) primary image PP of the scene, nor cases where the secondary image S originates from a panoramic secondary image (not shown). For purposes of the image fusion method 600 to be described, therefore, the assumption that the primary and secondary images have the same extent is without loss of generality. A use case where the primary image P is taken from a panoramic primary image PP is illustrated in FIG. 5, where only the right-hand portion of the scene is covered by a secondary camera that provides the secondary image S. In practical use cases, including video monitoring applications, it may not always be justified to arrange secondary cameras that cover the entire scene, rather those areas which are expected to be well illuminated may be left out without detriment. As suggested by FIG. 5, the secondary camera is directed at an area of a garden which is partially shadowed by a tree and which lacks nearby light sources.

At least some embodiments of the image fusion method 600 may be applied to primary and secondary images that have unequal spatial resolutions, i.e., images that comprise different numbers of pixels despite having equal extents.

For the purposes of the following description of the method 600, it is assumed that the primary and secondary images are partitioned into regions, and that correspondences exist between the regions of the primary and secondary image. This is suggested in FIG. 5, where the secondary image S is partitioned into a 3×2 matrix of rectangular regions, which are indexed by an example numbering scheme on the form (row, column). The primary image P, seen in the upper part of FIG. 5, is partitioned into a corresponding arrangement which is three regions tall and two regions wide. The upper left region of the primary image P and the upper left region of the secondary image S are corresponding regions. As briefly mentioned above, an image region in this sense may be a pixel or a group of neighboring pixels. It may be advantageous in implementations to use image regions that coincide with macroblocks in video coding, particularly predictive video coding. For an example technical definition of the term "macroblock", reference is made to any of the ITU-T H.26× video coding standards. Alternatively, the image regions may be assigned in such manner as to coincide with coding blocks to be used for block-wise transform coding of the primary or secondary image. This is convenient in implementations, notably by the fact that the reencoding of a video frame can begin before the video frame has been completely processed according to the image fusion method 600.

Figure 4:
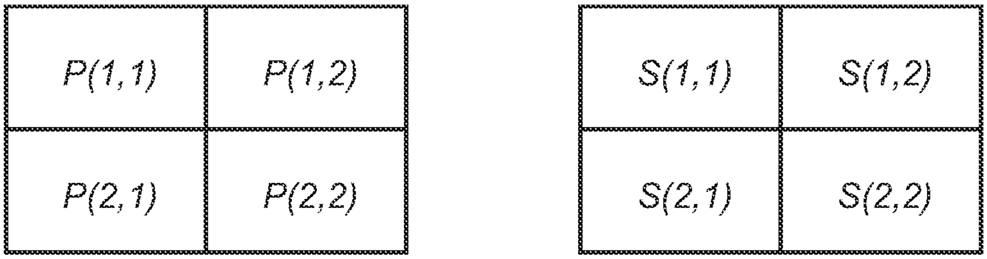
FIG. 4 shows a partition of the primary and secondary images into image regions.

FIG. 4 shows a partition of the primary image P and secondary image S into 2×2 regions, with the region indices explicitly indicated. This is a simplification for illustration purposes. In practical implementations of the method 600, the regions could be 8×8 pixels, 16×16 pixels or 64×64 pixels, so that their total number in a video frame is significantly higher. Without departing from the scope of the present disclosure, the partition into regions seen in FIGS. 4 and 5 can be varied significantly, to include non-square arrangements and/or arrangements of regions that are not homothetic to the image, and/or mixed arrangements of different regions that have different sizes or shapes. It is appreciated that some video coding formats support dynamic macroblock partitioning, i.e., the partition may be different for different video frames in a sequence, and that the partition into regions could follow such changes to the macroblock partitioning. This is relatively easy to implement, because the method 600 operates on one pair of source images at a time; therefore, the already generated target images (target frames) are not affected if the method 600 adopts a different partition into regions starting from a certain new frame.

Image Fusion Method

The method 600 begins with a step 602 of determining a local noise level of a region P(m, n) of the primary image P. The notation P(m, n) may be considered to refer to the image data which represents the region identified by index (m, n) in the primary image; the image data may be in pixel/plaintext format or in a transform format. The transform format may include coefficients obtained by a frequency-domain transformation.

The following is an example model for estimating effective noise $\sigma_{eff}$ of a sensor on the basis of read noise $\sigma_R$ and shot noise cS:

$$\sigma_{eff} = \sqrt{\sigma_R^2 + c \times u} \tag{1}$$

where $\sigma_R$ is generally constant, u is a sensor signal (local sensor reading) and c is an empirical constant. It is implicit that $\sigma_{eff}$ is variable across the image, i.e., it has a dependence at least on the image region index (m, n). In image regions comprising multiple pixels, the sensor reading u relates to a preselected one of the pixels (e.g., upper left pixel, middle pixel) or to a collective value (e.g., average, median). It is usually a legitimate assumption that the values of the constants $\sigma_R$, c are invariant under different use cases and over the lifetime of a sensor. It may therefore be sufficient in practical implementations to estimate the constants once for each sensor design, or to obtain them from a sensor manufacturer. If the actual sensor signal is a signed or complex quantity, or a vector, then u may be understood to be the magnitude of the sensor signal. It follows that the signal-to-noise ratio can be expressed as $$SNR = \frac{u}{\sigma_{eff}} = \frac{u}{\sqrt{\sigma_R^2 + c \times u}}. \tag{2}$$

It is noted that, in the simple sensor-noise model discussed here, the sensor signal u is the only variable quantity in the expressions (1) and (2). This is to say, the sensor signal u is used as a proxy for the sensor noise, and thus as a proxy for the local noise level of the primary image. In the example use case illustrated in FIG. 7, the local noise level of the primary image may be estimated based on a sensor-noise model for the RGB camera 710, and the local noise level of the secondary image—if any—may be estimated based on an independent sensor-noise model for the infrared camera 720.

The local noise level may be expressed in terms of a direct or inverse noise metric. Inverse metrics include SNR, SINR, signal-to-noise statistic and peak SNR, where the noise component is located in the denominator. An example direct metric could be a noise measurement carried out with a noise sensor or the noise estimation (1) from the sensor-noise model.

The execution of the method 600 goes on to a step 606 where a low-frequency (LF) component $P_{LF}(m, n)$ is derived from said region of the primary image. Further, a high-frequency (HF) component $S_{HF}(m, n)$ is derived from a corresponding region S(m, n) of the secondary image. The LF component may include all image data in the region of the primary image up to a cut-off frequency $f_c$ (spatial frequency), and the HF component may include all image data in the corresponding region of the secondary image up to an equal cut-off frequency $f_c$. As will be described in detail below, the cut-off frequency $f_c$ is constant throughout the primary image in some embodiments and variable in others.

In order to provide a more precise understanding of the cut-off frequency $f_c$, it is recalled that transform coding, in broad terms, includes projecting the image data on an orthogonal basis of biperiodic functions $\{\rho_{k_1,k_2}(n_1, n_2): k_1, k_2 \geq 0\}$. One has:

$$X_{k_1,k_2} = \sum_{n_1=0}^{N_1-1}\sum_{n_2=0}^{N_2-1} x_{n_1,n_2}\rho_{k_1,k_2}(n_1, n_2), \tag{3}$$

where $X_{k_1,k_2}$ is a transform coefficient for the frequencies ($k_1$, $k_2$) and $x_{n_1,n_2}$ is image data, e.g. the intensity of one color channel, for pixel ($n_1$, $n_2$). It is noted that the restriction of $\rho_{k_1,k_2}$ ($n_1$, $n_2$) to $[0, N_1]\times[0, N_2]$ may, for the lowest frequency pairs ($k_1$, $k_2$) correspond to a single period or a constant value. In particular, the basis may consist of real-valued biperiodic harmonic functions, such as discrete cosine transform (DCT) functions, discrete sine transform (DST) functions, discrete Fourier transform (DFT) functions, wavelet transform functions. In some embodiments, the orthogonal basis in (3) consists of discrete cosine functions:

$$\rho_{k_1,k_2}(n_1, n_2) = \cos\left[\frac{\pi}{N_1}\left(n_1+\frac{1}{2}\right)k_1\right]\cos\left[\frac{\pi}{N_2}\left(n_2+\frac{1}{2}\right)k_2\right]$$

The transform coefficients computed in the projection operation constitute a discrete representation of the spectrum of the image data, and each transform coefficient corresponds to a frequency pair ($k_1$, $k_2$).

Within step 606, the LF component of the region of the primary image is derived by keeping only transform coefficients relating to frequencies below the cut-off frequency $f_c$. In some embodiments, the LF component is computed such that transform coefficients $X_{k_1,k_2}$ relating to frequency pairs with an $l^2$ norm less than $f_c$ are maintained, which may conceptually be written as:

$$P_{LF}(m, n) = \{X_{k_1,k_2} : k_1^2 + k_2^2 \le f_C^2\}.$$

Figure 1:
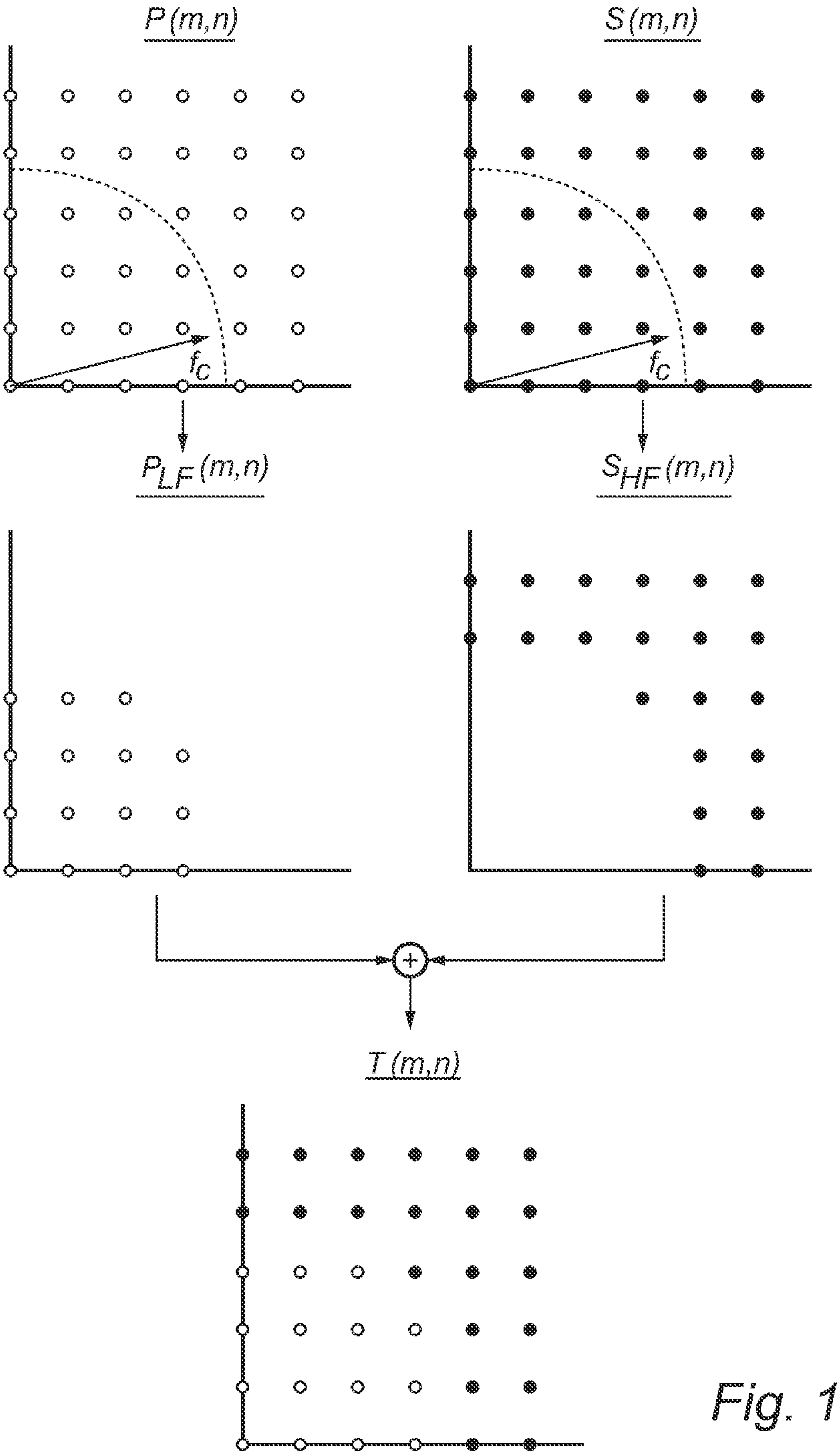
FIG. 1 depicts, in a two-dimensional frequency-plane plot, transform components of a region in a primary image and transform components of a corresponding region in a secondary image, the deriving of a respective LF and HF component of these transform coefficients, and the combining of the LF and HF components into transform coefficients of a target image region.

The remaining transform coefficients, above $f_c$, are set to zero. In FIG. 1, where the axes represent $k_1$ and $k_2$ respectively, this filtering operation corresponds to the transformation from P(m, n) to $P_{LF}$(m, n). Conversely, the HF component of the corresponding region of the secondary image is derived by keeping only transform coefficients $\tilde{X}_{k_1,k_2}$ relating to frequencies above the cut-off frequency $f_c$, $$S_{HF}(m, n) = \{\tilde{X}_{k_1,k_2} : k_1^2 + k_2^2 > f_C^2\}$$

and setting the remainder, below $f_c$, to zero.

In other embodiments, the LF component is computed such that transform coefficients relating to frequency pairs with an $l^1$ norm less than $f_c$ are maintained and the remainder is set to zero, that is:

$$P_{LF}(m, n) = \{X_{k_1,k_2} : |k_1| + |k_2| \le f_C\}.$$

Figure 2:
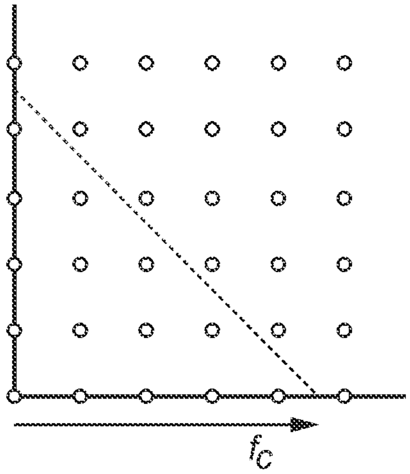
FIGS. 2 and 3 refer to alternative ways of deriving the LF and HF components.

This is illustrated in FIG. 2. In still other embodiments, the LF component is computed such that transform coefficients relating to frequency pairs with an $l^\infty$ norm less than $f_c$ are maintained and the remainder is set to zero, that is:

$$P_{LF}(m, n) = \{X_{k_1 k_2} : \max\{|k_1|, |k_2|\} \le f_C\}.$$

Figure 3:
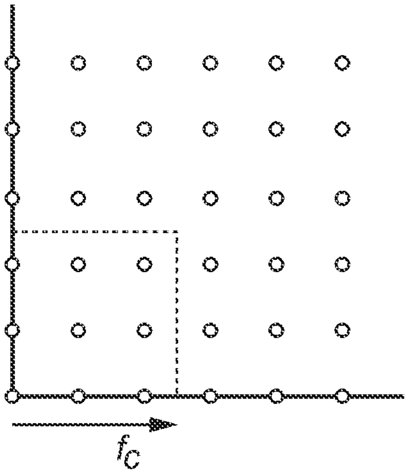

This is illustrated in FIG. 3. As those skilled in the art will readily understand, these embodiments can be generalized such that the transform coefficients are selected on the basis of an $l^p$ norm$\|(k_1, k_2)\|_p$ with any $p\ge1$.

It is foreseen that, in most implementations of the method 600, the cut-off frequency $f_c$ is applied with a finite steepness. This is to say, some amount of roll-off is included to avoid certain artefacts, and the roll-off may be dependent on the local noise level or other characteristics of the image region. Relating to the three LF-filtering options outlined above, the transform coefficients may be maintained if the norm of their frequency pairs is less than $f_c-\epsilon$, with $\epsilon>0$, and the transform coefficients may be set to zero if the norm of their frequency pairs is greater than $f_c+\epsilon$. A smooth transition is applied to those transform coefficients which, in terms of said norm, lie in the range $[f_c-\epsilon, f+\epsilon]$. The smoothness may correspond to $C^0$, $C^1$, $C^2$ continuity or higher.

It is noted that there exist ways to compute the LF and HF components without transforming the image data into a frequency-plane representation and then back. For example, a convolution with a suitable Gaussian kernel be used to limit the frequency content as desired. In another example, a real-time or continuous-time low-pass or high-pass filter can be utilized; the filter can be implemented as physical circuitry or by software instructions. In the case of a nonzero roll-off (finite steepness), the respective transfer functions of a low-pass (LP) filter and a high-pass (HP) filter may be of the form $$H_{LP}(s) = \frac{2\pi f_C}{s+2\pi f_C},$$
$$H_{HP}(s) = \frac{s}{s+2\pi f_C}.$$

The shape of the "smooth transition" mentioned above may correspond to the frequency-dependent magnitude of the transfer functions, such as $|H_{LP}(2\pi i f)|$.

After the completion of step 606, the execution flow of the method 600 proceeds to a step 610, where the LF component and the HF component are combined into a target image region T(m, n), wherein the HF component's relative contribution to the target image region increases gradually with the local noise level. The target image region corresponds to the region of the primary image, i.e., it has equal index (m, n) as this region. The combining is conceptually illustrated in FIG. 1, where the LF component $P_{LF}$(m, n) is added to the HF component to form the target image region T(m, n):

$$T(m, n) = P_{LF}(m, n) + S_{HF}(m, n) \tag{5}$$

In FIG. 1, the transform coefficients originating from the secondary image are symbolized by filled dots, and transform coefficients originating from the primary image are symbolized by hollow circles. The combining operation (5) may be carried out on a pixel representation or a frequency-space representation of the image data. It is understood that, if the target image is to be represented in the same color space as the primary image, the combining operation (5) may be carried out for multiple color channels. Accordingly, the image data from the sole (monochrome) channel of the secondary image region is split into multiple sub-contributions to the corresponding primary image region. In the RGB space, the contributions may be equal, or possibly adjusted in view of an applicable white balance setting so as to have a desired neutral appearance. In the YCbCr space, it may suffice to perform the combining operation (5) on the luminance channel Y.

In some embodiments, the relative contribution of the HF component is controlled by the use of a variable cut-off frequency $f_c=f_c(m, n)$. In other embodiments, to be described in detail below, the relative contribution of the HF component is controlled by varying a primary and a secondary weighting coefficient purposefully from one image region to another. In particular, the primary and secondary weighting coefficients may be varied over the interval [0, 1] independently for a LF and a HF component of the target image region T(m, n).

The combining step 610 may optionally be preceded by, or combined with, a normalization step 608. The normalization may be a rescaling of the secondary image by a scaling factor R(m, n) such that the LF component of the primary image becomes comparable or equal to a LF component (with respect to an equal cut-off frequency $f_c$) of the secondary image. Accordingly, equation (5) may be modified as $$T(m, n) = P_{LF}(m, n) + R(m, n)S_{HF}(m, n) \tag{6a}$$

with $$R(m, n) = \frac{Y(P_{LF}(m, n))}{Y(S_{LF}(m, n))}, \tag{6b}$$

where Y(·) denotes a luminance function representing the local brightness of the images, such as luma or relative luminance. For a monochrome image, the luminance is equal to the pixel intensity or average pixel intensity in the region. For a multichannel image, the luminance is a linear combination of the channels in linear units, e.g., in accordance with a predefined perceptual model. In the literature, there are various proposed or standardized luminance functions relating to different color spaces. In the particular case of the RGB color space (without gamma compression), the luminance can be computed as $$Y = 0.2126R + 0.7152G + 0.0722B.$$

In simple implementations, it is possible to use one color channel as a proxy for luminance, e.g., Y=G in the RGB color space. For the avoidance of doubt, it is emphasized that the scaling factor R(m, n) in equation (6b) depends on two LF components, the LF component of the primary image and a LF component of the secondary image. The LF component of the secondary image can be derived from the secondary image in a manner analogous to how the LF component of the primary image was derived, and using an equal cut-off frequency $f_c$:

$$S_{LF}(m, n) = \{\tilde{X}_{k_1,k_2} : k_1^2 + k_2^2 \le f_c^2\}.$$

The normalization operation (step 608) may be integrated into the combining operation (step 610), as per equation (6a). Alternatively, the normalization may be carried out prior to the combining, e.g., by first substituting $$S_{HF}(m, n) \mapsto R(m, n)S_{HF}(m, n)$$

and then evaluating (5). Further still, it is possible to implement the normalization as an operation acting on the primary image rather than the secondary image, or as operations acting on both the primary and secondary image.

The execution of method 600 continues by repeating 612 the above-described steps, together with any optional steps that are present in particular embodiments, for any remaining image regions, i.e., for any remaining values of the region index (m, n). It is emphasized that in each of these repetitions, the relative contribution of the HF component may be different, so that the fusion of the primary image and secondary image(s) is truly variable across the primary image. As a result, some regions of the target image will have, more or less, the appearance of the primary image, whereas other regions may have undergone heavy mixing with image data from the secondary image. This could be likened to applying a local night mode in the latter regions.

In a final step 614, the target image regions thus produced are then merged into a target image T.

First Group of Embodiments

As announced above, the image fusion method 600 covers a variety of embodiments which, for the clarity of the present disclosure, have been organized into three main groups. It is possible to combine technical features across these groups of embodiments into new embodiments. As those skilled in the art will appreciate, it is also possible to apply different technical features belonging to different groups of embodiments to different regions of one primary image.

In the first group of embodiments, the cut-off frequency is variable across the primary image, $f_c=f_c(m, n)$, where (m, n) is an image region index. Embodiments in this group may comprise an additional substep 606.1 of determining the cut-off frequency for a region of the primary image on the basis of the local noise level of said region. This determination can be repeated for one or more further regions of the primary image, so that different values of the cut-off frequency are applied when the respective LF and HF components are derived. In this connection, the amount of roll-off to be used in step 606 can be adjusted as well. For example, it may be preferable to apply relatively more roll-off in an image region if the cut-off frequency $f_c$ is relatively lower therein.

Specifically, the cut-off frequency is determined using a non-increasing function of the local noise level, $f_c=f_c(\sigma_{eff})$. (Equivalently, the cut-off frequency may be determined using a non-decreasing function of the SNR, $f_c=\tilde{f}_c(\mathrm{SNR})$.) As a result, the noisier the region of the primary image is, the greater part of the spectrum of the target image region will originate from the secondary image. Conversely, if a primary image region has a relatively lower noise content, the characteristics of the primary image are preserved to a larger extent. The non-increasing function of the local noise level is preferably a continuous function (including, in digital signal processing, a quasi-continuous function composed of a plurality of small increments). This way, the HF component's relative contribution to the target image region can be caused to increase gradually with the local noise level, so that threshold-type artefacts are fewer or less noticeable.

In one embodiment, the cut-off frequency $f_c$ is computed from the local noise level $\sigma$ as an affine function:

$$f_c(\sigma) = \begin{cases} f_{max}, & \sigma \le \sigma_1 \\ f_{max}\left(1 - \frac{\sigma - \sigma_1}{\sigma_2 - \sigma_1}\right), & \sigma_1 < \sigma \le \sigma_2 \\ 0, & \sigma_2 < \sigma \end{cases} \quad (7)$$

where $\sigma_1$, $\sigma_2$ are constants and $f_{max}$ is a maximum frequency for which transform coefficients are available in P(m, n) or S(m, n). It may be stated that $f_{max}$ is the maximum, with respect to the same p-norm as is used in step 606, over all frequency pairs ($k_1$, $k_2$) for which equation (3) is evaluated. Instead of the affine function (7), a smoother function can be used, in the form of a higher-order polynomial, an exponential function, a logistic function or the like.

Second Group of Embodiments

In the second group of embodiments, the LF component and the HF component (and, possibly, further components) are combined in accordance with one or more weighting coefficients $$w_{LF}^{(P)}(m, n), w_{HF}^{(P)}(m, n), w_{LF}^{(S)}(m, n), w_{HF}^{(S)}(m, n)$$

which are variable across the primary image. Each weighting coefficient $$w_{LF}^{(P)}(m, n), w_{HF}^{(P)}(m, n), w_{LF}^{(S)}(m, n), w_{HF}^{(S)}(m, n)$$

may be a real number in [0,1]. In these embodiments, one of the following example expressions can be used instead of equation (5):

$$T(m, n) = w_{LF}^{(P)}(m, n)P_{LF}(m, n) + w_{LF}^{(S)}(m, n)S_{LF}(m, n) + w_{HF}^{(P)}(m, n)P_{HF}(m, n) + w_{HF}^{(S)}(m, n)S_{HF}(m, n) \quad (8a)$$

$$T(m, n) = P_{LF}(m, n) + w_{HF}^{(P)}(m, n)P_{HF}(m, n) + w_{HF}^{(S)}(m, n)S_{HF}(m, n) \quad (8b)$$

$$T(m, n) = w_{LF}^{(P)}(m, n)P_{LF}(m, n) + w_{LF}^{(S)}(m, n)S_{LF}(m, n) + P_{HF}(m, n) \quad (8c)$$

$$T(m, n) = w_{LF}^{(P)}(m, n)P_{LF}(m, n) + w_{LF}^{(S)}(m, n)S_{LF}(m, n) + S_{HF}(m, n) \quad (8d)$$

It has been explained above how the LF component of the corresponding region of the secondary image can be computed. The HF component of the region of the primary image can be computed analogously as the HF component of the corresponding region of the secondary image.

According to equation (8a), different weighting coefficients are used for the LF component and HF component of the target image region T(m, n). The LF component may be imagined to be the sum of the two first terms in the equation, and the HF component the sum of the two later terms.

According to equation (8b), the LF component of the target image region originates from the primary image only, whereas the HF component of the target image region is a weighted combination of the HF component of the region P(m, n) of the primary image and the HF component of the corresponding region S(m, n) of the secondary image. This corresponds to assigning $$w_{LF}^{(S)}(m, n) = 0$$

in the more general equation (8a). In words, the combining operation in equation (8b) can be described in words as follows: the HF component from the secondary image is pre-combined with the HF component from the primary image in accordance with the weighting coefficients, before being combined with the LF component from the primary image into the target image region. The combination according to equation (8b) may be suitable if it is expected that the noise will affect mainly the higher part of the spectrum of the primary image.

According to equation (8c), the HF component of the target image region originates from the primary image only, whereas the LF component of the target image region is a weighted combination of the LF component of the region P(m, n) of the primary image and the LF component of the corresponding region S(m, n) of the secondary image. This corresponds to assigning $$w_{LF}^{(S)}(m, n) = 0$$

in equation (8a). The combination according to equation (8c) may be suitable if it is expected that the noise will affect mainly the lower part of the spectrum of the primary image.

According to equation (8d), the HF component of the target image region originates from the secondary image only, whereas the LF component of the target image region is a weighted combination of the LF component of the region P(m, n) of the primary image and the LF component of the corresponding region S(m, n) of the secondary image. This corresponds to assigning $$w_{HF}^{(P)}(m, n) = 0$$

in equation (8a). The combination according to equation (8d) may be suitable if it is expected that the upper part of the spectrum of the primary image will very often be heavily affected by noise.

Further, each of the above expressions can be complemented by a normalization factor, as shown in equation (6).

Embodiments in this group may comprise an additional substep 610.1 of determining the weighting coefficients $$w_{LF}^{(P)}(m, n), w_{HF}^{(P)}(m, n), w_{LF}^{(S)}(m, n), w_{HF}^{(S)}(m, n)$$

on the basis of the local noise level of said region P(m, n) of the primary image. This determination can be repeated for one or more further regions P(m', n') of the primary image, so that different values of the weighting coefficients are applied when the respective LF and HF components and further components, if any, are combined in step 610.

The determination may be subject to a convexity constraint. A separate LF and HF convexity constraint may apply. If the image data is expressed in linear units, the convexity constraint may be formulated $$w_{LF}^{(P)}(m,n)+w_{LF}^{(S)}(m,n)=1 \text{ or } w_{HF}^{(P)}(m,n)+w_{HF}^{(S)}(m,n)=1.$$

The convexity constraints may be applied on a per-frequency-band basis; indeed, there may be one convexity constraint for the coefficients acting on LF components, and another convexity constraint for the coefficients acting on HF components. Alternatively, the convexity constraint is for the squares of the weighting coefficients to have unit sum:

$$w_{LF}^{(P)}(m,n)^2+w_{LF}^{(S)}(m,n)^2=1.$$

In some of the embodiments in the second group, a secondary coefficient $$w_{LF}^{(S)}, w_{HF}^{(S)}$$

is used which is a non-decreasing function of the local noise level. The noisier the region of the primary image is, the more image data in the target image region will originate from the secondary image and vice versa. Alternatively or additionally, a primary coefficient $$w_{LF}^{(P)}, w_{HF}^{(P)}$$

is used which is a non-increasing function of the local noise level. The use of a primary coefficient with these properties has a corresponding effect of balancing the contributions from the primary and secondary images in accordance with the noise level.

In one embodiment, relating to the LF spectrum, a primary weighting coefficient is computed from the local noise level σ as an affine function:

$$w_{LF}^{(P)}(\sigma)=\begin{cases}1, & \sigma\le\sigma_1\\ 1-\dfrac{\sigma-\sigma_1}{\sigma_2-\sigma_1}, & \sigma_1<\sigma\le\sigma_2\\ 0, & \sigma_2<\sigma\end{cases}$$

where the dependency of σ on (m, n) is implicit, and the values of the constants $\sigma_1$, $\sigma_2$ are independent from those in equation (7). The secondary weighting coefficient can then be obtained as $$w_{LF}^{(S)}(\sigma)=1-w_{LF}^{(P)}(\sigma)=\begin{cases}0, & \sigma\le\sigma_1\\ \dfrac{\sigma-\sigma_1}{\sigma_2-\sigma_1}, & \sigma_1<\sigma\le\sigma_2\\ 1, & \sigma_2<\sigma\end{cases}$$

This has the effect of giving gradually more weight to the secondary image the higher the noise level σ is. Similarly, for the HF spectrum, the primary weighting coefficient may be defined as follows:

$$w_{HF}^{(P)}(\sigma)=\begin{cases}1, & \sigma\le\sigma_3\\ 1-\dfrac{\sigma-\sigma_3}{\sigma_4-\sigma_3}, & \sigma_3<\sigma\le\sigma_4\\ 0, & \sigma_4<\sigma\end{cases}$$

where constants $\sigma_3$, $\sigma_4$ can be set independently of the above constants $\sigma_1$, $\sigma_2$, and the secondary weighting coefficient may be computed as $$w_{HF}^{(S)}(\sigma)=1-w_{HF}^{(P)}(\sigma).$$

In different embodiments within the second group, the cut-off frequency $f_c$ can be variable between image regions, or it can be constant throughout the primary image. The constant cut-off frequency may be based on a global characteristic of the primary image P and/or the secondary image S. The global characteristic of the primary or secondary image may be, for example, average noise level or peak noise level. In particular, the constant cut-off frequency may be based on such a global characteristic of a panoramic primary image PP from which the primary image P originates, or a panoramic secondary image from which the secondary image S originates. Alternatively, the constant cut-off frequency may have a predefined value, in particular a value configured by a user or system administrator.

Third Group of Embodiments

In the third group of embodiments of the method 600, in a step 604, a local noise level $\sigma_S$ (m, n) of the corresponding region S(m, n) of the secondary image is determined, i.e., in addition to the determination of the local noise level $\sigma_P$(m, n) of the region P(m, n) of the primary image (which local noise level was denoted simply by σ in the description of the first and second groups of embodiments). When the LF and HF components $P_{LF}$(m, n) and $S_{HF}$(m, n) and any further image-data components are to be combined, it is then possible to determine the HF component's relative contribution in such manner that the target image region's local noise level $\sigma_T$(m, n) is below a threshold noise level σ*. In particular, the HF component's relative contribution can be determined such that the target image region's local noise level just reaches (is just below) the threshold noise level. This way, the noise target expressed by the threshold noise level is met while preserving the appearance of the primary image to the greatest possible extent. Formulated in somewhat different words, the embodiments in the third group provide that the secondary image's relative contribution—including the contribution from a HF component derived from the secondary image—shall be determined in such manner that the target image region's local noise level $\sigma_T$(m, n) is below a threshold noise level σ*.

As explained above, the region P(m, n) of the primary image generally has a higher local noise level than the corresponding region S(m, n) of the secondary image, and the noisiness of the primary region is alleviated by adding an amount of image data from the secondary image. The suitable amount of data from the secondary image depends not only on the local noise level of the primary image but also on the local noise level of the secondary image. Therefore, the noisier the corresponding region S(m, n) of the secondary image is, the more of it needs to be added if the local noise level of the primary image region is to go down to a tolerable noise level, i.e., the threshold noise level σ*. Based on the respective noise levels of the region of the primary image and the corresponding region of the secondary image, it is oftentimes possible to make a reliable prediction of the resulting local noise level or (m, n) of the target image region T(m, n). The prediction may rely on a linear combination of the respective noise levels $$\sigma_T(m, n) = \gamma_P \sigma_P(m, n) + \gamma_S \sigma_S(m, n),$$

where $\gamma_P$, $\gamma_S$ are positive constants. Alternatively, the squares of the respective noise levels are combined:

$$\sigma_T(m, n)^2 = \gamma_P \sigma_P(m, n)^2 + \gamma_S \sigma_S(m, n)^2.$$

Further alternatively, the local noise level $\sigma_T(m, n)$ of the target image region T(m, n) can be predicted using a regression model or a trained model. Each of these options may be expressed as a 'black-box' function W:

$$\sigma_T(m, n) = W(\sigma_P(m, n), \sigma_S(m, n)).$$

In some embodiments within the third group, the determination of the local noise levels of the region P(m, n) of the primary image and the corresponding region S(m, n) of the secondary image are restricted, respectively, to a low-frequency portion and a high-frequency portion thereof. This may allow for a more faithful prediction of the local noise level $\sigma_T(m, n)$ of the target image region T(m, n), notably since the combination in step 610 will not relate to the entirety of the regions P(m, n), S(m, n). The split into a low-frequency and high-frequency portion for the purpose of the local-noise estimation may be in accordance with the same cut-off frequency $f_c$ as is used in step 606, especially if this cut-off frequency $f_c$ is constant, or it may correspond to a different, preset frequency.

In some embodiments, the HF component's relative contribution may be computed as the minimal (i.e., exactly minimal or approximately minimal) value such that the target image region's local noise level $\sigma_T(m, n)$ is below the threshold noise level σ*. This may be achieved by aiming to combine the HF and LF components such that the threshold noise level is reached exactly and then increase or upscale the HF component's contribution by a predefined margin. Alternatively, this may be achieved by starting from a low value of the HF component's contribution and iteratively increasing it in small steps until the target image region's local noise level falls below the threshold noise level. Equivalently, the computations may aim to determine the relative contribution of the LF component such that the target region's noise level is below the threshold noise level.

The contribution of the HF component relative to the LF component is controlled by means of weighting coefficients $$w_{LF}^{(P)}(m, n), w_{HF}^{(P)}(m, n),$$

$$w_{LF}^{(S)}(m, n), w_{HF}^{(S)}(m, n)$$

in some embodiments within the third group, and it is controlled by means of the cut-off frequency $f_c$ in other embodiments. It is understood that the weighting coefficients $$w_{LF}^{(P)}(m, n), w_{HF}^{(P)}(m, n), w_{LF}^{(S)}(m, n), w_{HF}^{(S)}(m, n)$$

or cut-off frequency $f_c(m, n)$, respectively, are then variable across the primary image, and a determination is made independently for each region of the primary image. The determination is made in view of the threshold noise level. In this connection, the amount of roll-off to be used in step 606 can be adjusted as well. For example, it may be preferable to apply relatively more roll-off in an image region where the cut-off frequency $f_c$ is relatively lower.

The threshold noise level σ* may be a predefined value, which users or system owners can configure as they see fit. Alternatively, the threshold level may be computed for each new primary image or each new secondary image or each new combination of a primary and second image on the basis of a global characteristic of the image(s). The global characteristic may, for example, correspond to an average noise level or a peak noise level.

In one example, the contribution of the HF component relative to the LF component is controlled by means of variable weighting coefficients $$w_{HF}^{(P)}(m, n), w_{HF}^{(P)}(m, n)$$

to be applied to the respective HF components in such manner that the relative contribution of the HF component from the secondary image shall be the minimal value by which the target image region's local noise level is brought below the threshold noise level:

$$w_{HF}(m, n) = \min\{0 \le a \le 1 : \sigma_T(m, n) \le \sigma^*\} \tag{9}$$

Here, under an assumption of approximate linearity of the variances, the local noise level of the HF component from the target image region is given by $$\sigma_T(m, n) = a\gamma_P \sigma_P(m, n) + (1 - a)\gamma_S \sigma_S(m, n) \tag{10a}$$

$$\sigma_T(m, n)^2 = a\gamma_P \sigma_P(m, n)^2 + (1 - a)\gamma_S \sigma_S(m, n)^2 \tag{10b}$$

or $$\sigma_T(m, n) = W(a\sigma_P(m, n), (1 - a)\sigma_S(m, n)). \tag{10c}$$

The minimization (9) has a solution on closed form if (10a) or (10b) is used. If instead the expression (10c) is used, and for generic noise expressions, numerical methods can be relied upon, including iterative solvers.

CLOSING REMARKS

The aspects of the present disclosure have mainly been described above with reference to a few embodiments.

However, as is readily appreciated by a person skilled in the art, other embodiments than the ones disclosed above are equally possible within the scope of the disclosure, as defined by the appended patent claims. In particular, it is envisaged to perform image fusion on one primary image and N≥2 secondary images. For this purpose, a common cutoff frequency may be applied, and the relative contributions of the LF components derived from the primary image and multiple secondary images may be controlled by the use of weighting coefficients $$w_{LF}(m, n), w_{LF}^{(S,1)}(m, n), w_{LF}^{(S,2)}(m, n), \ldots , w_{LF}^{(S,N)}(m, n),$$

which are variable with respect to the image region index (m, n).

The invention claimed is:

1. A method of fusing a primary image (P) and a secondary image (S), wherein the primary image is noisier than the secondary image and wherein the primary image and secondary image are partitioned into regions, the method comprising:

determining a local noise level of a region (P(m, n)) of the primary image;

deriving a low-frequency, LF, component ($P_{LF}$(m, n)) from said region of the primary image and a high-frequency, HF, component ($S_{HF}$(m, n)) from a corresponding region (S(m, n)) of the secondary image, wherein the LF and HF components refer to a common cut-off frequency ($f_c$);

combining the LF component and the HF component into a target image region (T(m, n));

repeating the preceding steps for any remaining image regions; and merging all output target image regions thus obtained into a target image (T);

characterized in that the HF component's relative contribution to the target image region has a continuous increasing dependence on the determined local noise level of the region of the primary image.

2. The method of claim 1, wherein the cut-off frequency is variable across the primary image, the method further comprising determining the cut-off frequency for a region of the primary image on the basis of the local noise level of said region.

3. The method of claim 2, wherein the cut-off frequency is determined using a non-increasing function of the local noise level, such as a continuous non-increasing function of the local noise level.

4. The method of claim 1, wherein the LF component and the HF component are combined in accordance with one or more weighting coefficients which are variable across the primary image, the method further comprising determining the one or more weighting coefficients on the basis of the local noise level of said region of the primary image.

5. The method of claim 4, wherein the weighting coefficients include:

a primary coefficient ($W_{LF}^{(P)}$, $W_{HF}^{(P)}$) which is applied to a component of the region of the primary image and is a non-increasing function of the local noise level, and/or a secondary coefficient ($W_{LF}^{(S)}$, $W_{HF}^{(S)}$) which is applied to a component of the corresponding region of the secondary image and is a non-decreasing function of the local noise level.

6. The method of claim 4, wherein the cut-off frequency is constant throughout the primary image.

7. The method of claim 4, further comprising deriving a HF component ($P_{HF}$(m, n)) from the region of the primary image, wherein the HF component from the secondary image is pre-combined with the HF component from the primary image in accordance with the weighting coefficients, before being combined with the LF component from the primary image into the target image region.

8. The method of claim 1, further comprising determining a local noise level of the corresponding region of the secondary image, wherein the HF component's relative contribution is determined such that the target image region's local noise level is below a threshold noise level.

9. The method of claim 8, further comprising computing the HF component's relative contribution as the minimal value such that the target image region's local noise level is below the threshold noise level.

10. The method of claim 8, wherein the LF component and the HF component are combined in accordance with weighting coefficients which are variable across the primary image, the method further comprising determining the weighting coefficients on the basis of the respective local noise levels of said region of the primary and secondary image and on the basis of the threshold noise level.

11. The method of claim 8, wherein the cut-off frequency is variable across the primary image, the method further comprising determining the cut-off frequency on the basis of the respective local noise levels of said region of the primary and secondary image and on the basis of the threshold noise level.

12. The method of claim 8:

wherein the threshold noise level is predefined, and/or wherein the threshold noise level is based on a global characteristic of the primary image and/or the secondary image.

13. The method of claim 1, further comprising normalizing the secondary image to the primary image prior to completion of said combining.

14. The method of claim 1, wherein the local noise level of the region of the primary image is determined using a sensor-noise model dependent on a local sensor reading.

15. A device comprising processing circuitry arranged to perform a method of fusing a primary image (P) and a secondary image (S), wherein the primary image is noisier than the secondary image and wherein the primary image and secondary image are partitioned into regions, the method comprising:

determining a local noise level of a region (P(m, n)) of the primary image;

deriving a low-frequency, LF, component ($P_{LF}$(m, n)) from said region of the primary image and a high-frequency, HF, component ($S_{HF}$(m, n)) from a corresponding region (S(m, n)) of the secondary image, wherein the LF and HF components refer to a common cut-off frequency ($f_c$);

combining the LF component and the HF component into a target image region (T(m, n));

repeating the preceding steps for any remaining image regions; and merging all output target image regions thus obtained into a target image (T);

characterized in that the HF component's relative contribution to the target image region has a continuous increasing dependence on the determined local noise level of the region of the primary image.

16. A non-transitory computer-readable medium storing a computer program containing instructions for causing a computer to carry out the method of claim 1.

17. The method of claim 1, wherein one of the following holds:

(i) the cut-off frequency is variable across the primary image, the method further comprising determining the cut-off frequency for a region of the primary image on the basis of the local noise level of said region, wherein the cut-off frequency is determined using a non-increasing function of the local noise level;

(ii) the LF component and the HF component are combined in accordance with one or more weighting coefficients which are variable across the primary image, the method further comprising determining the one or more weighting coefficients on the basis of the local noise level of said region of the primary image;

(iii-1) the method further comprises determining a local noise level of the corresponding region of the secondary image, wherein the HF component's relative contribution is determined as the minimal value such that the target image region's local noise level is below the threshold noise level;

(iii-2) the LF component and the HF component are combined in accordance with weighting coefficients which are variable across the primary image, the method further comprising determining a local noise level of the corresponding region of the secondary image, and determining the weighting coefficients on the basis of the respective local noise levels of said region of the primary and secondary image and on the basis of the threshold noise level;

(iii-3) wherein the cut-off frequency is variable across the primary image, the method further comprising determining a local noise level of the corresponding region of the secondary image, and determining the cut-off frequency on the basis of the respective local noise levels of said region of the primary and secondary image and on the basis of the threshold noise level;

(iii-4) the method further comprises determining a local noise level of the corresponding region of the secondary image, wherein the threshold noise level is predefined and/or the threshold noise level is based on a global characteristic of the primary image and/or the secondary image.

18. The device of claim 15, wherein one of the following holds in respect of the method that the processing circuitry is arranged to perform:

(i) the cut-off frequency is variable across the primary image, the method further comprising determining the cut-off frequency for a region of the primary image on the basis of the local noise level of said region, wherein the cut-off frequency is determined using a non-increasing function of the local noise level;

(ii) the LF component and the HF component are combined in accordance with one or more weighting coefficients which are variable across the primary image, the method further comprising determining the one or more weighting coefficients on the basis of the local noise level of said region of the primary image;

(iii-1) the method further comprises determining a local noise level of the corresponding region of the secondary image, wherein the HF component's relative contribution is determined as the minimal value such that the target image region's local noise level is below the threshold noise level;

(iii-2) the LF component and the HF component are combined in accordance with weighting coefficients which are variable across the primary image, the method further comprising determining a local noise level of the corresponding region of the secondary image, and determining the weighting coefficients on the basis of the respective local noise levels of said region of the primary and secondary image and on the basis of the threshold noise level;

(iii-3) wherein the cut-off frequency is variable across the primary image, the method further comprising determining a local noise level of the corresponding region of the secondary image, and determining the cut-off frequency on the basis of the respective local noise levels of said region of the primary and secondary image and on the basis of the threshold noise level;

(iii-4) the method further comprises determining a local noise level of the corresponding region of the secondary image, wherein the threshold noise level is predefined and/or the threshold noise level is based on a global characteristic of the primary image and/or the secondary image.

19. The method of claim 17, wherein the weighting coefficients include:

a primary coefficient ($W_{LF}^{(P)}$, $W_{HF}^{(P)}$) which is applied to a component of the region of the primary image and is a non-increasing function of the local noise level, and/or a secondary coefficient ($W_{LF}^{(S)}$, $W_{HF}^{(S)}$) which is applied to a component of the corresponding region of the secondary image and is a non-decreasing function of the local noise level.

20. The method of claim 17, wherein the cut-off frequency is constant throughout the primary image.

21. The method of claim 17, further comprising deriving a HF component ($P_{HF}(m, n)$) from the region of the primary image, wherein the HF component from the secondary image is pre-combined with the HF component from the primary image in accordance with the weighting coefficients, before being combined with the LF component from the primary image into the target image region.

* * * * *